United States Patent
Woods et al.

(10) Patent No.: US 10,671,370 B2
(45) Date of Patent: Jun. 2, 2020

(54) DISTRIBUTING FILE SYSTEM STATES

(71) Applicant: Red Hat, Inc., Raleigh, NC (US)

(72) Inventors: Willard Woods, Raleigh, NC (US); Colin Walters, Westford, MA (US); Vincent Batts, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/993,146

(22) Filed: May 30, 2018

(65) Prior Publication Data

US 2019/0369979 A1 Dec. 5, 2019

(51) Int. Cl.
*G06F 21/10* (2013.01)
*G06F 9/44* (2018.01)
(Continued)

(52) U.S. Cl.
CPC .................. *G06F 8/65* (2013.01); *G06F 8/61* (2013.01); *G06F 16/137* (2019.01); *G06F 16/1734* (2019.01); *G06F 16/1752* (2019.01); *G06F 16/1787* (2019.01); *G06F 16/182* (2019.01); *G06F 16/1858* (2019.01); *G06F 8/60* (2013.01); *G06F 8/654* (2018.02); *G06F 16/27* (2019.01);
(Continued)

(58) Field of Classification Search
CPC ......... G06F 17/30091; G06F 17/30126; G06F 17/30575; G06F 17/30094; G06F 17/3023; G06F 17/5022; G06F 21/56; G06F 9/4418; G06F 21/64; G06F 21/554; G06F 21/00; G06F 21/602; G06F 21/6209; G06F 21/552; G06F 21/52; G06F 21/305; G06F 21/575; G06F 21/40; G06F 21/51; G06F 16/1752; G06F 16/1787; G06F 16/27; G06F 16/178; G06F 16/13; G06F 16/1748; G06F 16/137; G06F 16/1847; G06F 16/172; G06F 16/1858
See application file for complete search history.

(56) References Cited

U.S. PATENT DOCUMENTS 5,893,086 A * 4/1999 Schmuck ............ G06F 11/1435
5,940,838 A * 8/1999 Schmuck ............ G06F 12/0862
(Continued)

OTHER PUBLICATIONS

Michael E. Fisk et al., FileMap: map-reduce program execution on loosely-coupled distributed systems, Apr. 13, 2014, [Retrieved on Dec. 22, 2019]. Retrieved from the internet: <URL: https://dl.acm.org/citation.cfm?id=2592790> 6 Pages (1-6) (Year: 2014).*
(Continued)

*Primary Examiner* — Anibal Rivera
(74) *Attorney, Agent, or Firm* — Lowenstein Sandler LLP

(57) ABSTRACT

Disclosed herein is technology to capture and distribute a state of a file system that updates, removes, or adds a computer program to a computing device. An example method may include: analyzing a program package associated with a plurality of objects of a computer program; determining a state of a file system after an installation of the program package; generating a manifest that corresponds to the computer program and represents the state of the file system after the installation, the manifest comprising a hash tree that comprises object identification data of an object of the plurality of objects of the computer program; and providing the manifest to one or more computing devices.

20 Claims, 7 Drawing Sheets

(51) Int. Cl.
*G06F 17/50* (2006.01)
*G06F 12/08* (2016.01)
*G06F 8/65* (2018.01)
*G06F 8/61* (2018.01)
*G06F 16/13* (2019.01)
*G06F 16/182* (2019.01)
*G06F 16/17* (2019.01)
*G06F 16/18* (2019.01)
*G06F 16/174* (2019.01)
*G06F 16/178* (2019.01)
*H04L 29/08* (2006.01)
*G06F 16/903* (2019.01)
*G06F 8/654* (2018.01)
*G06F 16/27* (2019.01)
*G06F 8/60* (2018.01)

(52) U.S. Cl.
CPC ........ *G06F 16/90344* (2019.01); *H04L 67/10* (2013.01)

(56) References Cited

U.S. PATENT DOCUMENTS

| | | | | |
|---|---|---|---|---|
| 5,940,841 A * | 8/1999 | Schmuck | ............ | G06F 11/1435 |
| 5,946,686 A * | 8/1999 | Schmuck | ............ | G06F 16/1858 |
| | | | | 707/783 |
| 5,950,199 A * | 9/1999 | Schmuck | ............ | G06F 16/1858 |
| 5,956,734 A * | 9/1999 | Schmuck | ............ | G06F 16/1858 |
| 5,960,446 A * | 9/1999 | Schmuck | ............ | G06F 16/1858 |
| | | | | 707/610 |
| 5,963,963 A * | 10/1999 | Schmuck | ............ | G06F 9/5016 |
| 5,974,424 A * | 10/1999 | Schmuck | ............ | G06F 16/1858 |
| 5,987,477 A * | 11/1999 | Schmuck | ............ | G06F 16/1858 |
| 6,021,508 A * | 2/2000 | Schmuck | ............ | G06F 16/1858 |
| | | | | 714/4.5 |
| 6,023,706 A * | 2/2000 | Schmuck | ............ | G06F 16/1858 |
| 6,032,216 A * | 2/2000 | Schmuck | ............ | G06F 9/52 |
| | | | | 710/200 |
| 7,921,110 B1 * | 4/2011 | Ting | ............ | G06F 16/90344 |
| | | | | 707/736 |
| 8,078,909 B1 * | 12/2011 | Satish | ............ | G06F 11/302 |
| | | | | 714/15 |
| 8,099,605 B1 * | 1/2012 | Billsrom | ............ | G06F 11/1448 |
| | | | | 713/187 |
| 8,321,941 B2 * | 11/2012 | Tuvell | ............ | G06F 21/56 |
| | | | | 726/24 |
| 8,572,136 B2 * | 10/2013 | Guarraci | ............ | G06F 16/27 |
| | | | | 707/825 |
| 8,583,709 B2 * | 11/2013 | Joukov | ............ | G06F 17/30126 |
| | | | | 707/822 |
| 8,667,273 B1 * | 3/2014 | Billstrom | ............ | G06F 21/6209 |
| | | | | 713/165 |
| 8,706,701 B1 * | 4/2014 | Stefanov | ............ | G06F 21/64 |
| | | | | 707/687 |
| 8,773,909 B2 | 7/2014 | Li et al. | | |
| 8,832,455 B1 * | 9/2014 | Drewry | ............ | G06F 21/575 |
| | | | | 713/187 |
| 8,950,007 B1 * | 2/2015 | Teal | ............ | G06F 21/554 |
| | | | | 726/30 |
| 9,176,681 B1 * | 11/2015 | Xu | ............ | G06F 3/0631 |
| 9,239,841 B2 * | 1/2016 | Arnaudov | ............ | G06F 11/1453 |
| 9,372,865 B2 * | 6/2016 | Venkatesh | ............ | G06F 16/1748 |
| 9,495,373 B2 * | 11/2016 | Gheith | ............ | G06F 17/30091 |
| 9,524,157 B2 * | 12/2016 | Oliver | ............ | H04L 67/02 |
| 9,525,706 B2 * | 12/2016 | Lee | ............ | G06F 21/56 |
| 9,747,297 B2 * | 8/2017 | Penangwala | ............ | G06F 16/137 |
| 9,830,345 B1 * | 11/2017 | Baars | ............ | G06F 11/1451 |
| 2002/0107678 A1 * | 8/2002 | Wu | ............ | G06F 17/5022 |
| | | | | 703/14 |
| 2002/0188605 A1 * | 12/2002 | Adya | ............ | H04L 63/123 |
| 2004/0111608 A1 * | 6/2004 | Oom Temudo de Castro | | |
| | | | | G06F 21/40 |
| | | | | 713/156 |
| 2004/0117410 A1 * | 6/2004 | Dietterich | ............ | G06F 12/0813 |
| 2004/0236761 A1 * | 11/2004 | Both | ............ | G06F 16/137 |
| 2007/0234343 A1 * | 10/2007 | Gouge | ............ | G06F 21/51 |
| | | | | 717/174 |
| 2007/0240217 A1 * | 10/2007 | Tuvell | ............ | G06F 21/56 |
| | | | | 726/24 |
| 2008/0021907 A1 * | 1/2008 | Patel | ............ | G06F 11/1076 |
| 2008/0154978 A1 * | 6/2008 | Lemar | ............ | G06F 16/166 |
| 2008/0177994 A1 * | 7/2008 | Mayer | ............ | G06F 9/4418 |
| | | | | 713/2 |
| 2009/0037491 A1 * | 2/2009 | Cachin | ............ | G06F 21/64 |
| 2009/0157690 A1 * | 6/2009 | Haswell | ............ | G06F 16/119 |
| 2009/0199199 A1 * | 8/2009 | Pooni | ............ | G06F 9/5044 |
| | | | | 718/105 |
| 2009/0222474 A1 * | 9/2009 | Alpern | ............ | G06F 9/45558 |
| 2009/0293054 A1 * | 11/2009 | Sheehan | ............ | H04L 29/06 |
| | | | | 718/1 |
| 2009/0328024 A1 * | 12/2009 | Li | ............ | G06F 11/1435 |
| | | | | 717/169 |
| 2010/0023520 A1 * | 1/2010 | Barboy | ............ | G06F 16/11 |
| | | | | 707/E17.007 |
| 2010/0037056 A1 * | 2/2010 | Follis | ............ | G06F 11/1464 |
| | | | | 713/171 |
| 2010/0114832 A1 * | 5/2010 | Lillibridge | ............ | G06F 16/128 |
| | | | | 707/649 |
| 2010/0174752 A1 * | 7/2010 | Kimmel | ............ | G06F 11/1435 |
| | | | | 707/791 |
| 2010/0241895 A1 * | 9/2010 | Li | ............ | G06F 11/2025 |
| | | | | 714/4.4 |
| 2010/0293540 A1 * | 11/2010 | Sheehan | ............ | G06F 8/60 |
| | | | | 717/174 |
| 2010/0306270 A1 * | 12/2010 | McDiarmid | ............ | G06F 8/61 |
| | | | | 707/796 |
| 2011/0082836 A1 * | 4/2011 | Wang | ............ | G06F 16/1787 |
| | | | | 707/649 |
| 2011/0145499 A1 * | 6/2011 | Ananthanarayanan | | |
| | | | | G06F 12/0866 |
| | | | | 711/118 |
| 2011/0231455 A1 * | 9/2011 | Joukov | ............ | G06F 16/168 |
| | | | | 707/822 |
| 2011/0252412 A1 * | 10/2011 | Sasaki | ............ | G06F 21/305 |
| | | | | 717/168 |
| 2011/0276578 A1 * | 11/2011 | Allalouf | ............ | G06F 3/0604 |
| | | | | 707/755 |
| 2011/0289589 A1 * | 11/2011 | Kayashima | ............ | G06F 21/52 |
| | | | | 726/26 |
| 2011/0320508 A1 * | 12/2011 | Naito | ............ | G06F 21/554 |
| | | | | 707/827 |
| 2011/0321170 A1 * | 12/2011 | Onodera | ............ | G06F 21/552 |
| | | | | 726/26 |
| 2012/0011507 A1 * | 1/2012 | Sasaki | ............ | G06F 8/65 |
| | | | | 718/1 |
| 2012/0265836 A1 * | 10/2012 | Nemoto | ............ | G06F 16/178 |
| | | | | 709/211 |
| 2013/0086303 A1 * | 4/2013 | Ludwig | ............ | G06F 21/00 |
| | | | | 711/103 |
| 2013/0167138 A1 * | 6/2013 | Ekka | ............ | G06F 8/61 |
| | | | | 717/175 |
| 2013/0226888 A1 * | 8/2013 | Govind | ............ | G06F 16/172 |
| | | | | 707/698 |
| 2013/0290248 A1 * | 10/2013 | Fukatani | ............ | G06F 16/184 |
| | | | | 707/610 |
| 2013/0339643 A1 * | 12/2013 | Tekade | ............ | G06F 11/1461 |
| | | | | 711/162 |
| 2014/0229451 A1 * | 8/2014 | Venkatesh | ............ | G06F 16/1748 |
| | | | | 707/692 |
| 2014/0379648 A1 * | 12/2014 | Chiu | ............ | G06F 16/113 |
| | | | | 707/624 |
| 2015/0026132 A1 * | 1/2015 | Arnaudov | ............ | G06F 11/1453 |
| | | | | 707/639 |
| 2015/0026454 A1 * | 1/2015 | Boeuf | ............ | G06F 12/0269 |
| | | | | 713/152 |
| 2015/0067399 A1 * | 3/2015 | Jaroker | ............ | G06F 11/2294 |
| | | | | 714/37 |
| 2015/0143064 A1 * | 5/2015 | Bhargava | ............ | G06F 11/1451 |
| | | | | 711/162 |

(56) References Cited

U.S. PATENT DOCUMENTS

| | | | |
|---|---|---|---|
| 2015/0161153 A1* | 6/2015 | Gheith | G06F 3/0608 707/695 |
| 2015/0186393 A1* | 7/2015 | Serlet | G06F 3/0607 707/828 |
| 2015/0242478 A1* | 8/2015 | Cantwell | G06F 16/27 707/634 |
| 2016/0055171 A1* | 2/2016 | Araki | G06F 16/178 707/624 |
| 2016/0085769 A1* | 3/2016 | Penangwala | G06F 16/178 707/610 |
| 2016/0124676 A1* | 5/2016 | Jain | G06F 9/45558 713/176 |
| 2016/0188229 A1* | 6/2016 | Rabinovich | G06F 11/1464 711/114 |
| 2016/0196131 A1* | 7/2016 | Searle | H04L 69/40 717/173 |
| 2016/0196132 A1* | 7/2016 | Searle | H04L 41/082 717/173 |
| 2016/0291940 A1* | 10/2016 | Searle | H04L 63/10 |
| 2016/0291959 A1* | 10/2016 | Searle | H04L 41/082 |
| 2016/0292045 A1* | 10/2016 | Pillai | G06F 11/1464 |
| 2016/0292178 A1* | 10/2016 | Manville | G06F 16/1752 |
| 2016/0292429 A1* | 10/2016 | Manville | G06F 21/602 |
| 2016/0294605 A1* | 10/2016 | Searle | H04L 41/082 |
| 2016/0294614 A1* | 10/2016 | Searle | G06F 8/654 |
| 2016/0337437 A1* | 11/2016 | Gartsbein | H04L 67/06 |
| 2017/0083537 A1* | 3/2017 | Vellore Ramesh | G06F 16/1748 |
| 2017/0090786 A1* | 3/2017 | Parab | G06F 3/067 |
| 2017/0193004 A1* | 7/2017 | Karuppusamy | G06F 11/1004 |
| 2017/0316024 A1* | 11/2017 | Panigrahy | G06F 3/0604 |
| 2018/0068280 A1* | 3/2018 | Micali | G06Q 20/02 |
| 2018/0082043 A1* | 3/2018 | Witchey | G16H 10/40 |
| 2018/0095955 A1* | 4/2018 | Kuang | G06F 16/17 |
| 2018/0143882 A1* | 5/2018 | Dodge | G06F 16/1847 |
| 2018/0173747 A1* | 6/2018 | Baird, III | G06F 16/2365 |
| 2018/0203942 A1* | 7/2018 | Liu | G06F 16/9014 |
| 2018/0315141 A1* | 11/2018 | Hunn | G06F 16/93 |
| 2018/0359096 A1* | 12/2018 | Ford | H04L 9/3236 |
| 2019/0020629 A1* | 1/2019 | Baird, III | H04L 63/0428 |
| 2019/0034453 A1* | 1/2019 | Jarvis | G06F 16/178 |
| 2019/0042619 A1* | 2/2019 | Baird, III | G06F 16/9024 |
| 2019/0205458 A1* | 7/2019 | Goldberg | G06F 9/547 |
| 2019/0268147 A1* | 8/2019 | Baird, III | G06F 16/182 |
| 2019/0306173 A1* | 10/2019 | Reddy | G06F 21/577 |

OTHER PUBLICATIONS

Jbenet, JRFC 20—Merkle DAG', 2014, https://github.com/jbenet/random-ideas/issues/20, 8 pages.

Paebbels, "Why is Git not considered a "block chain"?", 2013, https://stackoverflow.com/questions/46192377/why-is-git-not-considered-a-block-chain, 4 pages.

NEKIT1234007, "The BitTorrent Protocol Specification v2", 2017, https://news.ycombinator.com/item?id=14951728, 16 pages.

* cited by examiner

US 10,671,370 B2

DISTRIBUTING FILE SYSTEM STATES

TECHNICAL FIELD

The present disclosure is generally related to installing computer programs on a computing device, and is more specifically related to capturing and disseminating a state of a file system that is updated to include a computing program.

BACKGROUND

Modern computers are designed to be customizable and can be customized by users or other computers by adding computer programs that perform particular computing tasks. The computer programs are often included in installation packages that can be used to add the computing programs onto a computer. The installation packages are traditionally available at a central repository and the computer may include an installer that interprets the installation packages. The installer may unpack content of the installation package and update the file system of the computer to support the execution of the computer program. The process of unpacking and updating computer based on an installer package may be a resource intensive and time consuming task.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
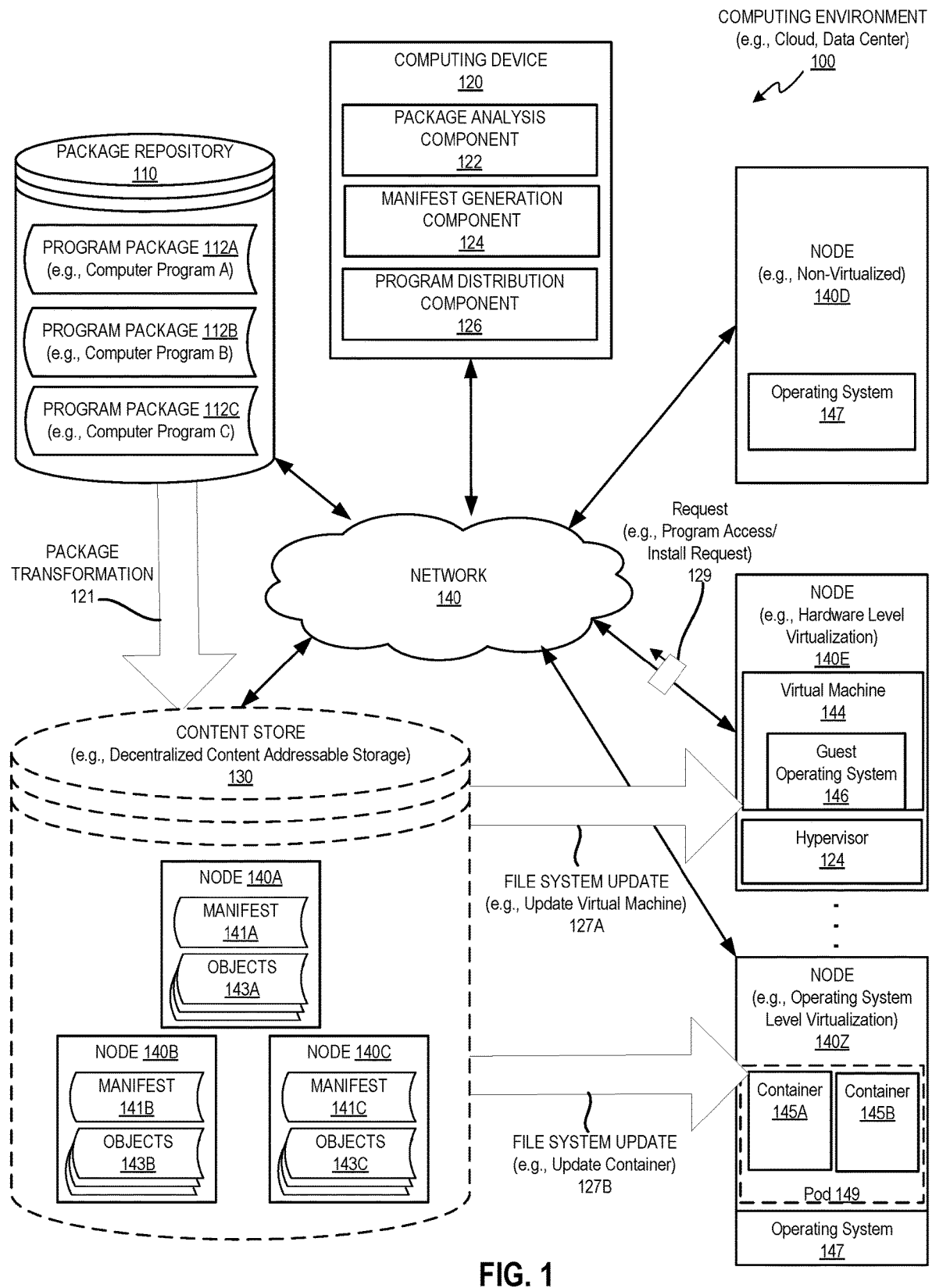
FIG. 1 depicts a high-level block diagram of an example computing environment, in accordance with one or more aspects of the present disclosure.

Computers are often customized to include computer programs and configuration information to enable the computers to perform computing tasks. The computer programs are included in program packages that are accessible by a computer and enable the computer to install the computer programs. Computer programs are often revised and the package for both a newer version and an older version may be stored on a repository and remain available for installation. Installing or updating a version of the computer program on a group of computer may be a time and resource intensive process that requires access to the program package. The process may be enhanced by updating a single computer that can function as a template for the other computers in the group. The single computer may be updated using a newer version of the program package and the updated state of the file system may be captured as a file system image. The file system image may be a part of a virtual machine image, container image, other image, or a combination thereof. The file system image may be copied to each of the other computers in the group so that each of the other computers (e.g., physical or virtual computers) includes the updated version of the computer program. When the file system image needs to be revised (e.g., security patch or version update), a separate file system image may be created. Both the file system images and the corresponding program packages may be quite large (e.g., Gigabytes), even though the difference between corresponding versions may be relatively small (e.g., a few kilobytes). When updating a computer program using a program package or a file system image, a computer may have to retrieve the entire program package or the entire file system image from a central repository even though only a small portion has changed.

Aspects of the present disclosure address the above and other deficiencies by providing technology to capture and reproduce the state of a file system to add, remove, or update a computer program on a computing device. In one example, the technology disclosed herein may involve analyzing a program package associated with a computer program. The program package may include the computer program and one or more objects to enable the computer program to perform a computing task. The objects may include an executable for the computer program as well as one or more libraries, configuration files, installation scripts, settings, other data, or a combination thereof. The technology may determine an updated state of a file system when the program package is installed. The determination may involve a simulated installation or an actual installation of the program package on a computing device. The technology may generate a manifest based on the installation and the manifest may represent the changes to the state of the file system caused by the installation. The manifest may be a data structure (e.g., file, record) that corresponds to the particular computer program and may include one or more hash trees (e.g., merkle trees) that include object identification data of one or more objects of the computer program.

The technology may provide the manifest to one or more other computing devices to enable the computing devices to update the state of a file system without retrieving an entire program package or an entire file system image. The manifest may be used to update the file systems of the computing devices to enable, disable, or revise the execution of the computer program. The computing devices may use the manifest to identify any missing objects that correspond to the computer program. The object identification data of the manifest may include a content addressable identifier (e.g., object's hash value) that uniquely identifies the object without being tied to a particular storage location (e.g., identifier is content addressable as opposed to location addressable). This may enable the computing device to retrieve the computer program objects from a peer device, from the computing device's own file system, from a content store (e.g., decentralized or centralized), other content source, or a combination thereof.

The systems and methods described herein include technology that enhances the field of computer provisioning and deployment. In particular, aspects of the present disclosure may enable a more resource efficient technique for storing and updating a computer to add, remove, or revise computer programs. The technology may use manifests to identify the minimum amount of changes that can be applied to a file system to support the execution of a new computer program or a new version of a previously installed computer program. The changes may include the addition, replacement, or modification of one or more file system objects (e.g., files, directories, metadata structures). The manifests may enable a computing device to retrieve the minimum amount of changes and avoid retrieving an entire program package or file system image. Aspects of the present disclosure may also enable a computing device to retrieve the changes from a decentralized content store in a security enhanced manner by using content addressable storage identifiers (e.g., object hash). The content addressable storage identifier may uniquely identify the changes (e.g., altered objects) without being restricted to a particular location (e.g., storage path or file name). Therefore, the changes may be retrieved from any location and minimize the risk that the content is incorrect, corrupt, or has been maliciously altered, because if the content were altered its content addressable storage identifier would also be altered. In addition to the advantages discussed above, the aspects disclosed also reduce the consumption of network resources (e.g., smaller content transferred), processing resources (e.g., less changes can be applied), and storage resources (e.g., less duplicative content) of both the computing device applying the changes and the computing devices hosting the changes.

Various aspects of the above referenced methods and systems are described in details herein below by way of examples, rather than by way of limitation. The examples provided below discuss a computing environment where the computing programs are executed using virtualization technology (e.g., virtual machines or containers), but other examples may include computing programs that are executed on physical machines that are absent the virtualization technology discussed below (e.g., absent hardware level virtualization or operating system level virtualization).

FIG. 1 illustrates an exemplary computing environment 100 in which implementations of the disclosure may operate. Computing environment 100 may include a package repository 110, a computing device 120, content store 130, a plurality of nodes 140A-Z, and a network 150. Network 150 may be a public network (e.g., the internet), a private network (e.g., a local area network (LAN) or wide area network (WAN)), or a combination thereof. In one example, network 150 may include a wired or a wireless infrastructure, which may be provided by one or more wireless communications systems, such as a wireless fidelity (WiFi) hotspot connected with the network 150 and/or a wireless carrier system that can be implemented using various data processing equipment, communication towers, etc.

Package repository 110 may store one or more program packages 112A-C and share the program packages 112A-C with other computing devices. Each of the program packages 112A-C may correspond to one or more computer programs and may include data for installing the computer programs on a computing device. A computer program may include any data that can be executed, interpreted, or run by a computing device to perform a computing task. The computer program and may be a part of or function as an application, operating system (e.g., kernel driver), basic input/output system (BIOS), firmware, other executable component, or a combination thereof. The computer program may be executed by one or more processors (e.g., physical processors or virtual processors) associated with a physical computing device (e.g., bare metal device), a virtual computing device (e.g., virtual machine or container), other device, or a combination thereof.

A program package may be a data structure that stores data for one or more computer programs and the stored data may be in the form of binary data, textual data, image data, other data, or a combination thereof. The data structure may be or include one or more file system objects (e.g., file, directory, metadata), database objects (e.g., record, table, key value pair, tuple), other objects, or a combination thereof. Program packages 112A-C may be referred to as an installation packages, installation archives, setup files, another term or phrase, or a combination thereof. Each of the program packages 112A-C may be generated by a package process in view of one or more sources (e.g., source code, libraries, text files, image files) and may involve copying, moving, compiling, interpreting, linking, building, other operation, or a combination thereof. In one example, each of the program packages 112A-C may be a file that includes one or more databases (e.g., installation database, index database). Examples of program package formats may include Red Hat® Packet Manager (RPM) package, Microsoft Windows® Installer Package (MSI), Apple® Extensible Archiver (XAR), a Debian® package (DEB), Android® Package (APK), other package format, or a combination thereof.

Computing device 120 may include one or more physical or virtual computing devices that have access to a program package and are capable of performing a package transformation 121. Package transformation 121 may involve processing program packages 112A-C to generate manifests that represent file system states after the program packages are installed. The manifests and their use may function as a layer of abstraction built on top of an existing package infrastructure, which may create, distribute, and deploy computer programs using standardized program packages. The manifests may identify the changes to a file system that result when an installation processes occurs and may avoid the overhead of downloading and processing the program package on a target device. In one example, computing device 120 may integrate with a program build environment that generates the program packages. In another example, computing device 120 may be located separate from the program build environment but may access program packages directly or indirectly from the program build environment. For example, computing device 120 may be at a client site and may receive program packages from a third party and may or may not customize the program packages before performing package transformation 121.

In the example, shown in FIG. 1, computing device 120 may include a package analysis component 122, a manifest generation component 124, and a program distribution component 126. Package analysis component 122 may access a program package and may analyze and unpack the program package to identify how an installation of the program package would affect a file system of a target device. Manifest generation component 124 may determine the objects added, modified, checked, or replaced by the installation and generate a manifest that identifies the objects. The manifest may include one or more hash trees that include hashes of the content of the objects and may represent the updated state (e.g., delta state) of the file system. Program distribution component 126 may enable computing device 120 to provide (e.g., directly or indirectly) the manifest and objects of the computer program to a target device that intends to execute the computer program but may not have the computer program installed. The manifests and the identified objects may be used to perform file system updates 127A-B to the target devices (e.g., nodes 140E and 140Z) and may be done in response to requests 129 by the target devices to execute or install the computer program. Program distribution component 126 may provide the target device access to the manifests, objects, or a combination thereof using one or more content stores 130.

Content store 130 may include one or more storage devices that are cable of storing and sharing manifests 141A-C and objects 143A-C with other devices. Content store 130 may be a decentralized content store, a centralized content store, or a combination thereof. In the example shown in FIG. 1, content store 130 may be a decentralized content store that distributes the manifests 141A-C and the objects 143A-C across multiple nodes 140A-C. In another example (not shown), the content store 130 may be a centralized content store that provides centralized access to the manifests and objects in a manner that is the same or similar to package repository 110. The centralized content store may include one or more repositories and each of the repositories may include manifests, objects, or a combination of both the manifests and the objects. In one example, content store 130 may be a decentralized content addressable storage system and may be the same or similar to a content store implemented by the GIT distributed revision control system.

Content store 130 may include content addressable storage, location addressable storage, or a combination thereof. Content Addressable Storage (CAS) may be data storage that stores and retrieves elements based on the content of the element and not the storage location of the element. The identifiers used to retrieve elements may be a direct representation of the content of the element. For example, a content addressable storage identifier may be a hash of one or more data blocks of the element and a change to the content of the element causes the identifier to change. Content addressable storage may be a permanent-storage analogue to content-addressable memory and may be intended to store data that does not change or changes infrequently. When the stored elements remain unchanged, the content addressable storage may be referred to as Fixed Content Storage (FCS). Location addressable storage is different from content addressable storage and may store and retrieve stored elements based on location identifiers as opposed to content identifiers. The location identifier may identify a particular location where the element is being stored and may be independent from the content of the stored element. Whether the content is changed after it is stored may have no effect on the location identifier used to retrieve the stored element. In one example, a location identifier may identify a file based on a file name or storage path (e.g., relative or absolute path) or may identify a record based on a key (e.g., object identifier (OID)) and neither the file name, storage path, nor key may be effected when the content of the file or record are changed.

Nodes 140E-Z may be the same or similar to nodes 140A-D that make up content store 130 and may comprise one or more computing devices with one or more processors communicatively coupled to memory devices and input/output (I/O) devices, as described in more details herein below with references to FIG. 7. Although nodes 140A-Z comprise a computing device, the term "node" may refer to a computing device (e.g., physical machine), a virtual machine, container, or a combination thereof. Each of the nodes 140A-Z may provide one or more levels of virtualization such as hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Node 140E node may provide hardware level virtualization by running a hypervisor 142 that provides hardware resources to one or more virtual machines 144. Hypervisor 142 may be any program or combination of programs and may run directly on the hardware (e.g., bare-metal hypervisor) or may run on or within a host operating system (not shown). The hypervisor may manage and monitor various aspects of the operations of the computing device, including the storage, memory, and network interfaces. The hypervisor may abstract the physical layer features such as processors, memory, and I/O devices, and present this abstraction as virtual devices to a virtual machine 144 executing a guest operating system 146.

Guest operating system 146 may be any program or combination of programs that are capable of managing computing resources of virtual machine 144 and/or node 140E. Guest operating system 146 may include a kernel comprising one or more kernel space programs (e.g., memory driver, network driver, file system driver) for interacting with virtual hardware devices or actual hardware devices. In one example, guest operating system 146 may include Linux®, Solaris®, Microsoft Windows®, Apple Mac®, other operating system, or a combination thereof.

Node 140Z may be similar to node 140E and may provide operating system level virtualization by running a computer program that provides computing resources to one or more containers 145A-B. Operating system level virtualization may be implemented within the kernel of operating system 147 and may enable the existence of multiple isolated containers. In one example, operating system level virtualization may not require hardware support and may impose little to no overhead because programs within each of the containers may use the system calls of the same underlying operating system 147. This may enable node 140Z to provide virtualization without the need to provide hardware emulation or be run in an intermediate virtual machine as may occur with hardware level virtualization. Operating system level virtualization may provide resource management features that isolate or limit the impact of one container (e.g., container 145A) on the resources of another container (e.g., container 145B).

The operating system level virtualization may provide a pool of computing resources that are accessible by container 145A and are isolated from one or more other containers (e.g., container 145B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 147 may include an operating system virtualizer that may provide containers 145A-B with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 145A-B may refer to a resource-constrained process space of node 140Z that can execute functionality of a program. Containers 145A-B may be referred to as a user-space instances, a virtualization engines (VE), or jails and may appear to a user as a standalone instance of the user space of operating system 147. Each of the containers 145A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 149 may be a data structure that is used to organize one or more containers 145A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 140Z. In another example, the containers associated with a particular pod may be located on different nodes that are on the same or different physical machines.

Figure 2:
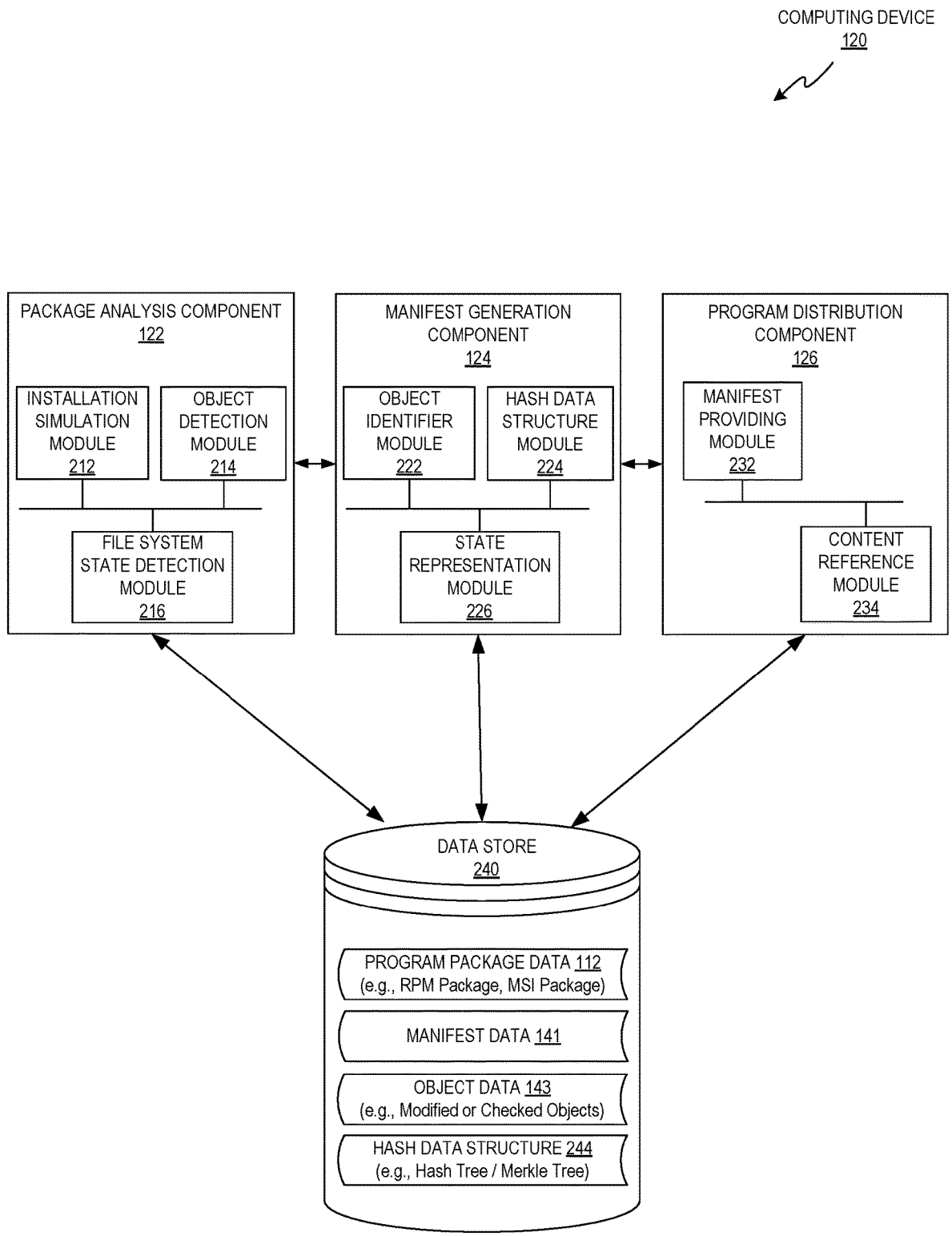
FIG. 2 depicts a block diagram of an example computing device with one or more components and modules for analyzing program packages and generating manifests for distributing updated file system states, in accordance with one or more aspects of the present disclosure.

FIG. 2 is a block diagram illustrating example components and modules of computing device 120, in accordance with one or more aspects of the present disclosure. The components, modules, or features discussed in regards to computing device 120 may be consolidated to the computing device 120 or be spread across multiple devices. In the example shown in FIG. 2, computing device 120 may include a package analysis component 122, a manifest generation component 124, and a program distribution component 126.

Package analysis component 122 may access a program package and may analyze and unpack the program package to identify the effects of an installation of the program package on a file system of a target device. In one example, package analysis component 122 may include an installation simulation module 212, an object detection module 214, and a file system state determination module 999.

Installation simulation module 212 may enable computing device 120 to perform an installation of a package program to determine the changes to a file system that are caused by the installation. Installation simulation module 212 may incorporate, integrate, or access features of an installer program. The features of the installer program may involve performing one or more operations on or for a program package and may involve extracting, unpacking, decoding, decompressing, inspecting, checking, interpreting, executing, searching, downloading, linking, other operation, or a combination thereof. The features of the installer may execute on computing device 120 or on another computing device (e.g., target device, example device, test device).

The installation may be a simulated installation, an actual installation, or a combination thereof. The simulated installation may involve analyzing and processing the content of a program package without installing the computer program on a target device. In one example, this may involve processing the content of the program package and updating a staging data structure (e.g., a staging tree) with the updates associated with the installation. The staging data structure may be transformed to represent a portion of an updated file system (e.g., a root file system) and include the changes to a file system caused by the installation. An actual installation may involve analyzing and processing the content of the program package to update an actual target device. The target device may be a physical or virtual computing device and may be the same or different from computing device 120.

Object detection module 214 may detect which objects are modified or checked by the installation of the program package and may store this information as object data 143. A modified object may be any object that is added, replaced, edited, linked, moved, removed, other action, or a combination thereof. A checked object may correspond to an object that the installation process checks to confirm its existence or non-existence. Even though a checked object may not be modified, the existence of the check during an installation may indicate that the object may be associated with the computer program being installed (e.g., a dependency). Object detection module 214 may determine an object was checked if the object was accessed or a portion of a data structure associated with the object (e.g., index, digest) was analyzed before, during, or after an installation. Object data 143 may include data related to the modified or checked objects and may include object metadata (e.g., name, location, size, author, creation time, modification time) or object content (e.g., data blocks) from before, during, or after the modification. The detected objects may be executable objects or non-executable objects and may include binary data, textual data, image data, audio data, other data, or a combination thereof. The detected objects may be file objects or database objects and some example objects may include executables, libraries, scripts, settings, configurations, text files, licenses, images, other object data, or a combination thereof.

The detected objects may all be associated with a computer program but one or more of the objects may have been internal to the program package (e.g., included within the program package) and one or more of the objects may have been external to the program package (e.g., not included within the program package). For example, the detected objects may include an executable of the computer program and one or more libraries associated with the executable object. The executable may be included within the program package and the one or more libraries may not be included within the program package. One or more of the detected objects that are not included within the program package may exist on the target device prior to the installation and may have been checked during the installation or may exist on a separate device and be retrieved (e.g., linked, downloaded) during the installation. In other examples, the modified object may include a change to an object that existed on the target device prior to the installation. The change may include a change to text, code, values, other data, or a combination thereof. The change may be represented by object data 143, which may identify the object that changed and indicate the content of the change (e.g., content added, removed, replaced, edited, or combination thereof).

File system state determination module 999 may enable computing device 120 to determine a state of a file system after an installation of the program package. The state of the file system may represent some or all of the content of the file system before, during, or after the installation. In one example, the state of the file system may represent the objects or content that have been checked or modified and may not include content that remained the same. This may be referred to as a delta state, a state update, a state modification, other term, or a combination thereof. In another example, the state of the file system may include one or more states and represent all of the content before, during, or after the installation. For example, file system state determination module 999 may detect or analyze a first file system state of the target device before the installation and a second file system state after the installation to determine the results of the installation (e.g., differences caused by the installation).

Manifest generation component 124 may access the data of package analysis component 122 and generate a manifest that represents the file system updates that correspond to an installed computer program. Manifest generation component 124 may determine the objects checked or modified by the installation and generate and store manifest data 141 in view of these objects. Manifest data 141 may include one or more hash trees that include hashes of the content of the objects and may represent the updated state (e.g., delta state) of a file system. In the example shown in FIG. 2, manifest generation component 124 may include an object identifier module 222, a hash data structure module 224, and a state representation module 226.

Object identifier module 222 may analyze object data (e.g., modified objects) and generate object identification data for an object. The object identification data may include one or more object identifiers to identify corresponding objects in a content store. As discussed above, the content store may be content addressable storage and the identifier may include a content addressable storage identifier. The identifier may be based on the content of the object and a change to the content of an object may cause the identifier to be updated (e.g., regenerated, recreated). In one example, the identifier may be a hash of the object or a hash of a portion of one or more objects.

Object identifier module 222 may generate the object identification data (e.g., identifier) based on one or more hash functions. A hash function may be any function that can be used to map data of arbitrary size to data of a fixed size. The values calculated by the hash function may be referred to as hash values, hash codes, digests, or simply hashes. The hash function may be cryptographic hash function and may enable a device that intends to execute a computer program to easily identify and verify the content of an object associated with the computer program. A property of a cryptographic hash is that it may enable a computing device to verify that received input data maps to a given hash value, but if the input data is unknown it may be deliberately difficult to reconstruct it by knowing the stored hash value. This property may enhance the ability of the computing device to determine the integrity of a received object. In one example, the hash function may be a Secure Hash Algorithm (e.g., SHA-2, SHA-3, SHA-(n)) but in other examples it may be another cryptographic hash function (e.g., MD5, MDC-2) or a non-cryptographic hash function (e.g., checksum, Cyclic Redundancy check (CRC)).

Hash data structure module 224 may generate a hash data structure 244 that includes the object identification data discussed above. Hash data structure 244 may be a hash tree (e.g., Merkle tree), a hash list, a hash chain, other data structure, or a combination thereof. The hash tree may be a tree data structure with one or more leaf nodes and one or more non-leaf nodes. One or more of the leaf nodes (e.g., every leaf node) may be associated with the hash of a data block of an object or a set of objects. One or more of the non-leaf nodes (e.g., every non-leaf node) may be associated with the hash of one or more of the hashes of its child nodes (e.g., a hash of a hash). The hash tree may be referred to as a tree of hashes and the leaf nodes may include hashes of object data blocks and non-leaf nodes may include hashes of the hashes of respective child nodes. When a non-leaf node has multiple child nodes, the subsequent hash (e.g., hash of a hash) may involve concatenating one or more hash values. The concatenation may occur before applying the subsequent hash or after applying the subsequent hash. For example, the hash values of two leaf nodes may each be hashed and the results concatenated or may be concatenated and the result hashed. In either case, the resulting hash of a hash may be associated with one or more parent nodes of the leaf nodes. The same hash function or different hash functions may be used for the hashing of the data block and the hashing of the hash values.

State representation module 226 may generate a manifest to represent the state of a file system that supports the execution of the computer program. The manifest may be a data structure that includes the hash data structure discussed above and may also include other data (e.g., metadata). The hash data structure may provide the changes to a file system that may occur if the program package were installed on a target device. The other data may relate to the computing program (e.g., version information), the originating computing device (e.g., author), the target device (e.g., hardware architecture, operating system, file system,), other information, or a combination thereof. A single manifest may correspond to a particular computer program or to a particular set of computer programs. The set of computer programs may function together and may or may not be dependent on one another. In one example, the set of computer programs may include a solution stack of computer programs (e.g., program stack) and may include an operating system, database system, web server, application, other program, or a combination thereof. The manifest may be advantageous because it may enable the file system of a target device to be updated to include the objects necessary to execute a computer program without the overhead of retrieving the entire program package or a file system image.

Program distribution component 126 may enable computing device 120 to make manifests and the objects of the computer program accessible to other computing devices that intend to execute the computer program. The other devices may be absent (e.g., lacking, without, missing) the computer program or may include a different version of the computer program. Program distribution component 126 may provide access to the manifests, objects, or a combination thereof using one or more content stores 130. In one example, program distribution component 126 may include a manifest providing module 232 and a content referencing module 234.

Manifest providing module 232 may provide access to the manifests that correspond to the one or more computer programs. In one example, computing device 120 may provide access to the manifest by storing the manifests and transmitting the manifests to one or more target devices. In another example, computing device 120 may provide access to the manifests by sharing a reference (e.g., link) to the manifest and transmitting the reference to the one or more target devices. The reference may include textual data, binary data, or a combination thereof that may enable a receiving device to request or access the manifest. The reference may include a content-addressable storage identifier, a location addressable storage identifier, other identifier, or a combination thereof. The reference may correspond to content store 130 discussed above, which may be a centralized or decentralized content store. In one example, the reference may include an embedded identifier (e.g., hash) of the manifest and the references may be the same or similar to a Uniform Resource Identifier (URI), Uniform Resource Locator (URL), Uniform Resource Name (URN), other reference, or a combination thereof.

Content referencing module 234 may provide access to the objects identified by the manifest and that correspond to the one or more computer programs. In one example, computing device 120 may provide access to the objects by storing the objects and transmitting the objects to one or more target devices. In another example, computing device 120 may provide access to the manifests by sharing a reference (e.g., link) to the objects and transmitting the reference to the one or more target devices. The reference may include textual data, binary data, or a combination thereof that may enable a receiving device to request or access the manifest. The reference may include a content-addressable storage identifier, a location addressable storage identifier, other identifier, or a combination thereof. The reference may correspond to content store 130 discussed above, which may be a centralized or decentralized content store. The content store may be the same content store that included the manifest or may be a different content store. In one example, the reference may include an embedded identifier (e.g., hash) of the object or a set of objects and may be the same or similar to a Uniform Resource Identifier (URI), Uniform Resource Locator (URL), Uniform Resource Name (URN), other reference, or a combination thereof.

Program distribution component 126 may be advantageous because it may provide access to a manifest for a version of a computer program and enable a target device to identify particular objects needed to execute the computer program. The target device may already include one or more of the objects identified by the manifest and can move or arrange them according to the manifest and may request the remaining objects from a content store (e.g., peer or centralized or decentralized repository). It may then retrieve (e.g., request and receive) the remaining objects individually or in a pack file (e.g., tar, zip). These objects may then be used to update the file system of the target device to enable it to execute the computer program.

Figure 3:
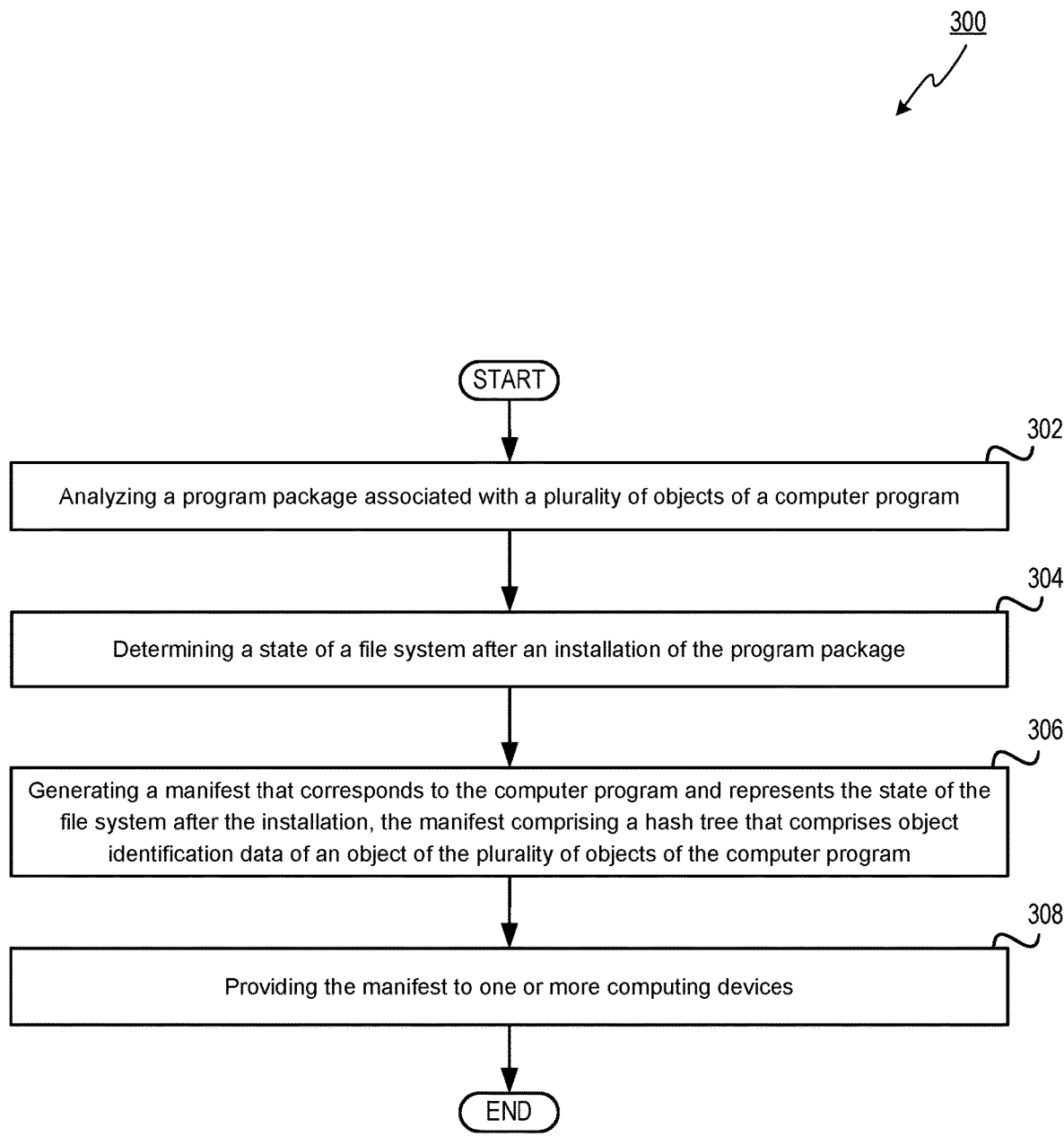
FIG. 3 depicts a flow diagram of an example method for distributing file system states, in accordance with one or more aspects of the present disclosure.

FIG. 3 depicts a flow diagram of one illustrative example of a method 300 for distributing a file system state that comprises a particular computer program, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, methods 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 122, 124, and 126 as shown in FIGS. 1 and 2.

Method 300 may be performed by processing devices of a server device or a client device and may begin at block 302. At block 302, a processing device may analyze a program package associated with a plurality of objects of a computer program. The plurality of objects associated with the program package may include one or more objects internal to the program package and one or more objects external to the program package. In one example, the one or more objects internal to the program package may include an executable file of an application and the one or more objects external to the program package may include a library file of an operating system.

At block 304, the processing device may determine a state of a file system after an installation of the program package. In one example, determining the state of the file system may involve simulating an installation of the program package and identifying a file system location of one or more of the plurality of objects in view of the simulated installation. In another example, determining the state of the file system may involve performing an actual installation on a test computing device and comparing the file system states of the test computing device before, during, or after the installation.

At block 306, the processing device may generate a manifest that corresponds to the computer program and represents the state of the file system after the installation. The manifest may provide data for updating a file system of the one or more computing devices to enable execution of the computer program. The manifest may include a hash tree that comprises object identification data of an object of the plurality of objects of the computer program. The object identification data may include an identifier for a content addressable store and the identifier may include a hash of the object stored in the content addressable store.

Generating the manifest may involve calculating a plurality of hashes for the plurality of objects of the computer program and creating the hash tree in view of the plurality of hashes. The hash tree may include hashes of data blocks of an object or a set of objects of the computer program. In one example, the hash tree may include a leaf node and a non-leaf node and the leaf node may include or correspond to a hash value of the object of the computer program and the non-leaf node may include a hash of the hash value.

At block 308, the processing device may provide the manifest to one or more computing devices. The manifest may correspond to a plurality of computer programs available for installation on the one or more computing devices and the manifest may include a hash tree for each of the plurality of computer programs respectively. The processing device may provide the manifest by providing a reference of the manifest to the one or more computing devices. The reference may be created by the processing device and may be stored and transmitted (e.g., shared) by one or more other devices, such as a content store or by one or more nodes that have the corresponding computer program installed. The reference may be a link (e.g., URL) to a decentralized content store comprising one or more content addressed stores and the reference may include an identifier (e.g., hash) of the manifest, object, or a combination thereof. Responsive to completing the operations described herein above with references to block 308, the method may terminate.

Figure 4:
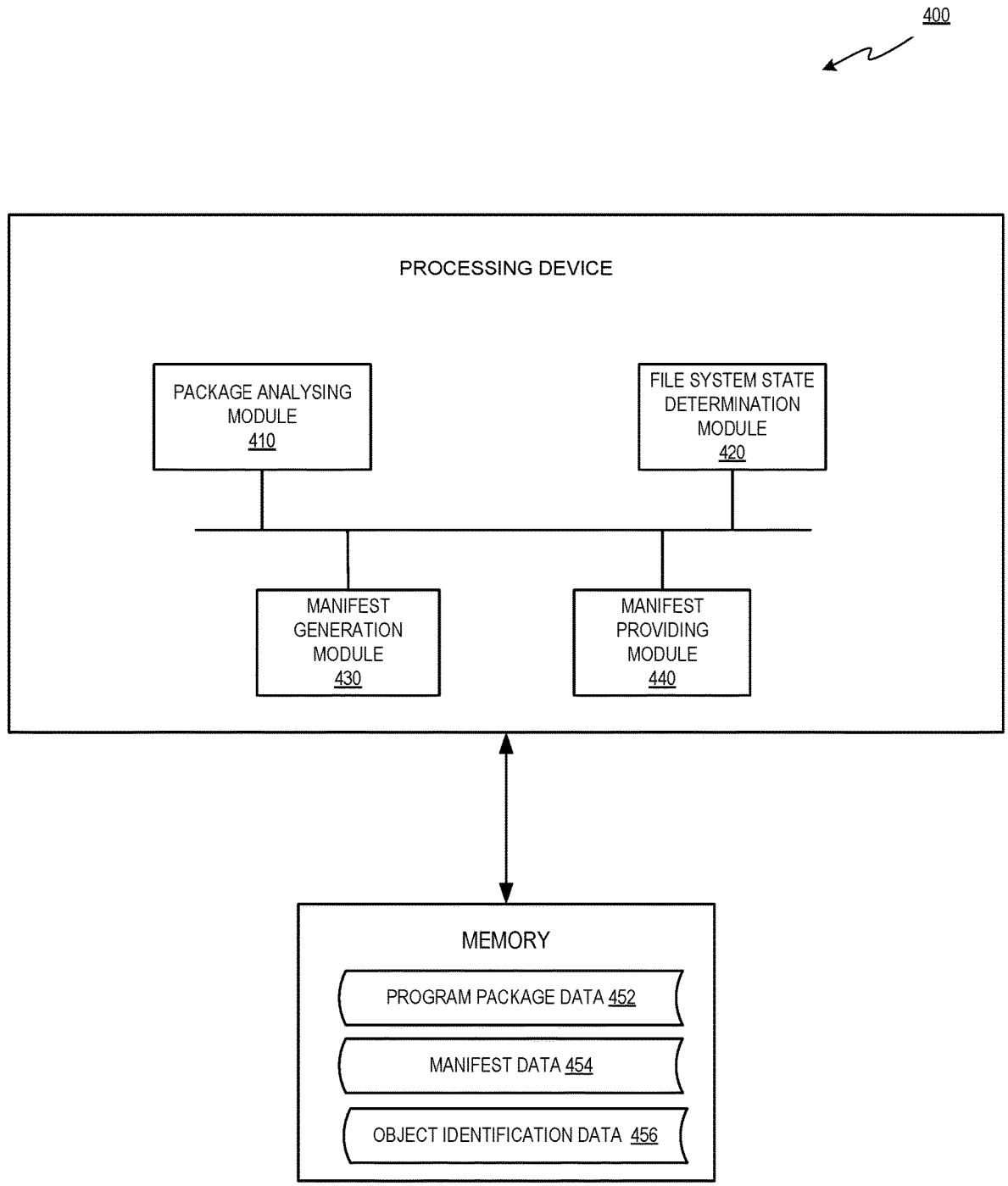
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer device 600 and may include one or more processing devices and one or more memory devices. In the example shown, computer system 400 may include a package analyzing module 410, a file system state determination module 420, a manifest generation module 430, and a manifest providing module 440.

Package analyzing module 410 may enable a processing device to analyze program package data 452 of a program package associated with a plurality of objects of a computer program. The plurality of objects associated with the program package may include one or more objects internal to the program package and one or more objects external to the program package. In one example, the one or more objects internal to the program package may include an executable file of an application and the one or more objects external to the program package may include a library file of an operating system.

File system state determination module 420 may enable the processing device to determine a state of a file system after an installation of the program package. In one example, determining the state of the file system may involve simulating an installation of the program package and identifying a file system location of one or more of the plurality of objects in view of the simulated installation. In another example, determining the state of the file system may involve performing an actual installation on a test computing device and comparing the file system states of the test computing device before, during, or after the installation.

Manifest generation module 430 may enable the processing device to generate a manifest in view of manifest data 454, which corresponds to the computer program and represents the state of the file system after the installation. The manifest may include data for updating a file system of the one or more computing devices to enable execution of the computer program. The manifest may include a hash tree that comprises object identification data 456 of an object of the plurality of objects of the computer program. The object identification data may include an identifier for a content addressable store and the identifier may include a hash of the object stored in the content addressable store. Generating the manifest may involve calculating a plurality of hashes for the plurality of objects of the computer program and creating the hash tree in view of the plurality of hashes. The hash tree may include hashes of data blocks of an object or a set of objects of the computer program. In one example, the hash tree may include a leaf node and a non-leaf node and the leaf node may include or correspond to a hash value of the object of the computer program and the non-leaf node may include a hash of the hash value.

Manifest providing module 440 may enable the processing device to provide the manifest to one or more computing devices. The manifest may correspond to a plurality of computer programs available for installation on the one or more computing devices and the manifest may include a hash tree for each of the plurality of computer programs respectively. The processing device may provide the manifest by providing a reference of the manifest to the one or more computing devices. The reference may be created by the processing device and may be stored and transmitted (e.g., shared) by one or more other devices, such as a content store or by one or more nodes that have the corresponding computer program installed. The reference may be a link (e.g., URL) to a decentralized content store comprising one or more content addressed stores and the reference may include an identifier (e.g., hash) of the manifest, object, or a combination thereof.

Figure 5:
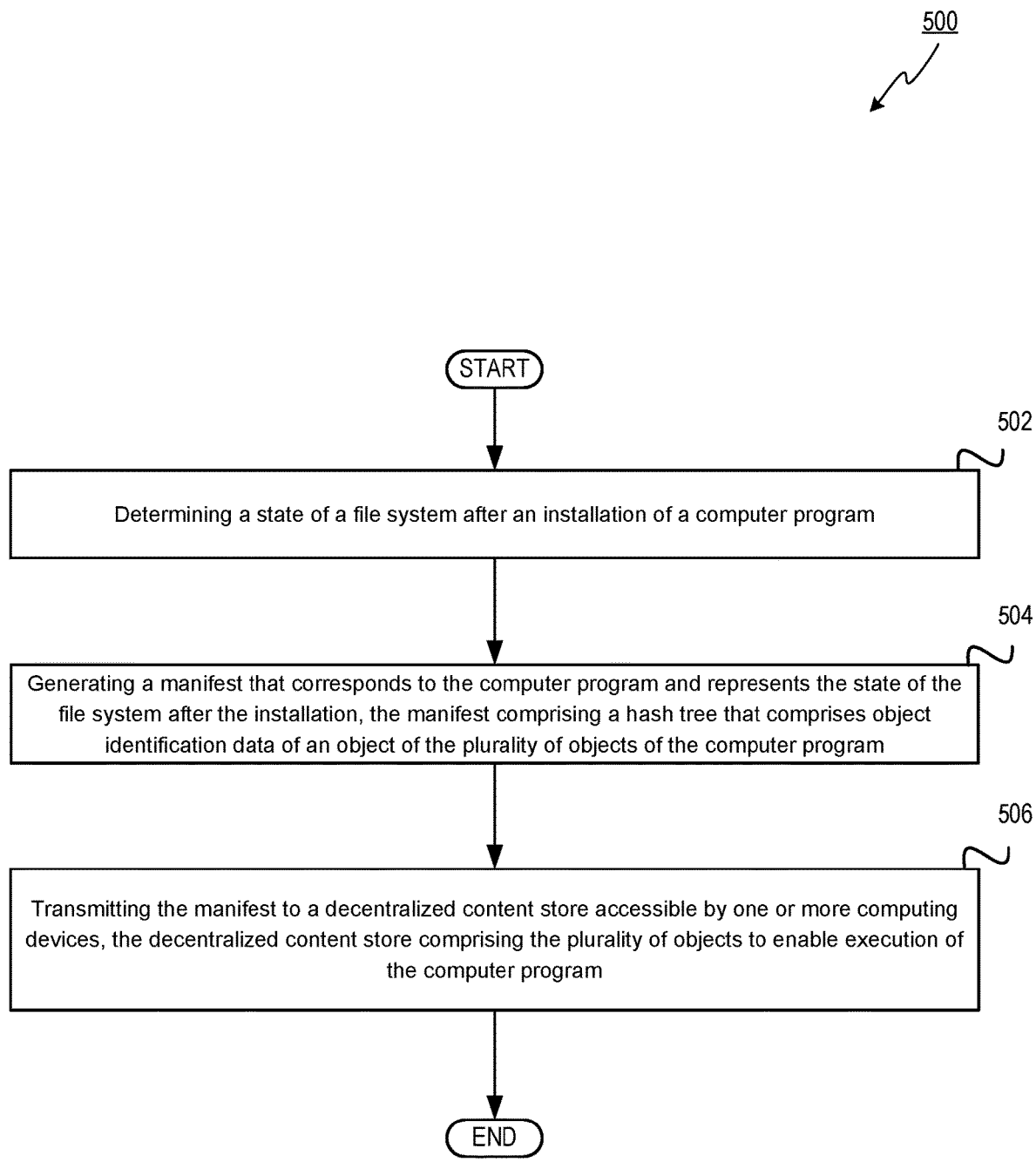
FIG. 5 depicts a flow diagram of another example method for distributing file system states, in accordance with one or more aspects of the present disclosure.

FIG. 5 depicts a flow diagram of one illustrative example of a method 500 for distributing a file system state that comprises a particular computer program, in accordance with one or more aspects of the present disclosure. Method 500 may be similar to method 300 and each of its individual functions, routines, subroutines, or operations may be performed by one or more processors of the computer device executing the method. Method 500 may be performed by processing devices of a server device or a client device and may begin at block 502.

At block 502, the processing device may determine a state of a file system after an installation of the program package. In one example, determining the state of the file system may involve simulating an installation of the program package and identifying a file system location of one or more of the plurality of objects in view of the simulated installation. In another example, determining the state of the file system may involve performing an actual installation on a test computing device and comparing the file system states of the test computing device before, during, or after the installation. The processing device may determine the state in response to analyzing the program package associated with a plurality of objects of a computer program. The plurality of objects associated with the program package may include one or more objects internal to the program package and one or more objects external to the program package. In one example, the one or more objects internal to the program package may include an executable file of an application and the one or more objects external to the program package may include a library file of an operating system.

At block 504, the processing device may generate a manifest that corresponds to the computer program and represents the state of the file system after the installation. The manifest may provide data for updating a file system of the one or more computing devices to enable execution of the computer program. The manifest may include a hash tree that comprises object identification data of an object of the plurality of objects of the computer program. The object identification data may include an identifier for a content addressable store and the identifier may include a hash of the object stored in the content addressable store.

Generating the manifest may involve calculating a plurality of hashes for the plurality of objects of the computer program and creating the hash tree in view of the plurality of hashes. The hash tree may include hashes of data blocks of an object or a set of objects of the computer program. In one example, the hash tree may include a leaf node and a non-leaf node and the leaf node may include or correspond to a hash value of the object of the computer program and the non-leaf node may include a hash of the hash value.

At block 506, the processing device may transmit the manifest to a decentralized content store accessible by one or more computing devices. The decentralized content store may include the objects that enable execution of the computer program. In one example, the processing device may transmit the manifest (e.g., provide the manifest) by transmitting a reference of the manifest to the one or more computing devices. The reference may be created by the processing device and may be stored and transmitted (e.g., shared) by one or more other devices, such as a content store or by one or more nodes that have the corresponding computer program installed. The reference may be a link (e.g., URL) to a decentralized content store comprising one or more content addressed stores and the reference may include an identifier (e.g., hash) of the manifest, object, or a combination thereof. Responsive to completing the operations described herein above with references to block 506, the method may terminate.

Figure 6:
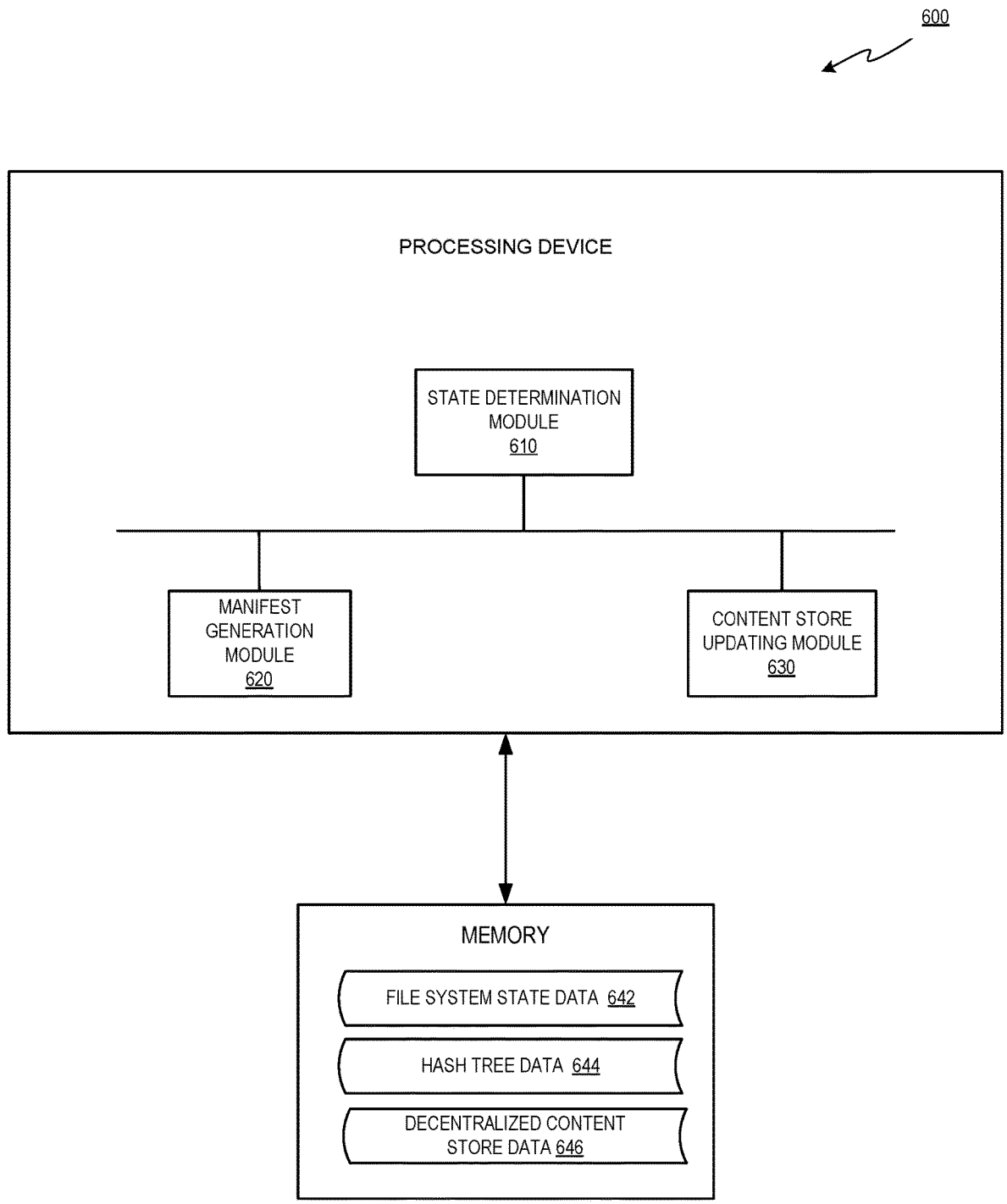
FIG. 6 depicts a block diagram of another example computer system in accordance with one or more aspects of the present disclosure.

FIG. 6 depicts a block diagram of a computer system 600 operating in accordance with one or more aspects of the present disclosure. Computer system 600 may include one or more processing devices and one or more memory devices. In the example shown, computer system 600 may include a state determination module 610, a manifest generation module 620, and a content store updating module 630.

State determination module 610 may enable a processing device to determine a state of a file system after an installation of the program package. The state may be represented by file system state data 642 and may indicate the objects of a file system that have been added, removed, checked, edited, or a combination thereof. In one example, determining the state of the file system may involve simulating an installation of the program package and identifying a file system location of one or more of the plurality of objects in view of the simulated installation. In another example, determining the state of the file system may involve performing an actual installation on a test computing device and comparing the file system states of the test computing device before, during, or after the installation.

The processing device may determine the state in response to analyzing the program package associated with a plurality of objects of a computer program. The plurality of objects associated with the program package may include one or more objects internal to the program package and one or more objects external to the program package. In one example, the one or more objects internal to the program package may include an executable file of an application and the one or more objects external to the program package may include a library file of an operating system.

Manifest generation module 620 may enable the processing device to generate a manifest that corresponds to the computer program and represents the state of the file system after the installation. The manifest may provide data for updating a file system of the one or more computing devices to enable execution of the computer program. The manifest may include a hash tree that includes hash tree data 644 that comprises object identification data of an object of the plurality of objects of the computer program. The object identification data may include an identifier for a content addressable store and the identifier may include a hash of the object stored in the content addressable store.

Generating the manifest may involve calculating a plurality of hashes for the plurality of objects of the computer program and creating the hash tree in view of the plurality of hashes. The hash tree may include hashes of data blocks of an object or a set of objects of the computer program. In one example, the hash tree may include a leaf node and a non-leaf node and the leaf node may include or correspond to a hash value of the object of the computer program and the non-leaf node may include a hash of the hash value.

Content store updating module 630 may enable the processing device to transmit the manifest to a decentralized content store accessible by one or more computing devices. The processing device may format the manifest and/or corresponding objects into decentralized content store data 646 prior to transmitting the data. The decentralized content store may include the objects that enable execution of the computer program. In one example, the manifest may correspond to a plurality of computer programs available for installation on the one or more computing devices and the manifest may include a hash tree for each of the plurality of computer programs respectively. The processing device may transmit the manifest (e.g., provide the manifest) by transmitting a reference of the manifest to the one or more computing devices. The reference may be created by the processing device and may be stored and transmitted (e.g., shared) by one or more other devices, such as a content store or by one or more nodes that have the corresponding computer program installed. The reference may be a link (e.g., URL) to a decentralized content store comprising one or more content addressed stores and the reference may include an identifier (e.g., hash) of the manifest, object, or a combination thereof.

Figure 7:
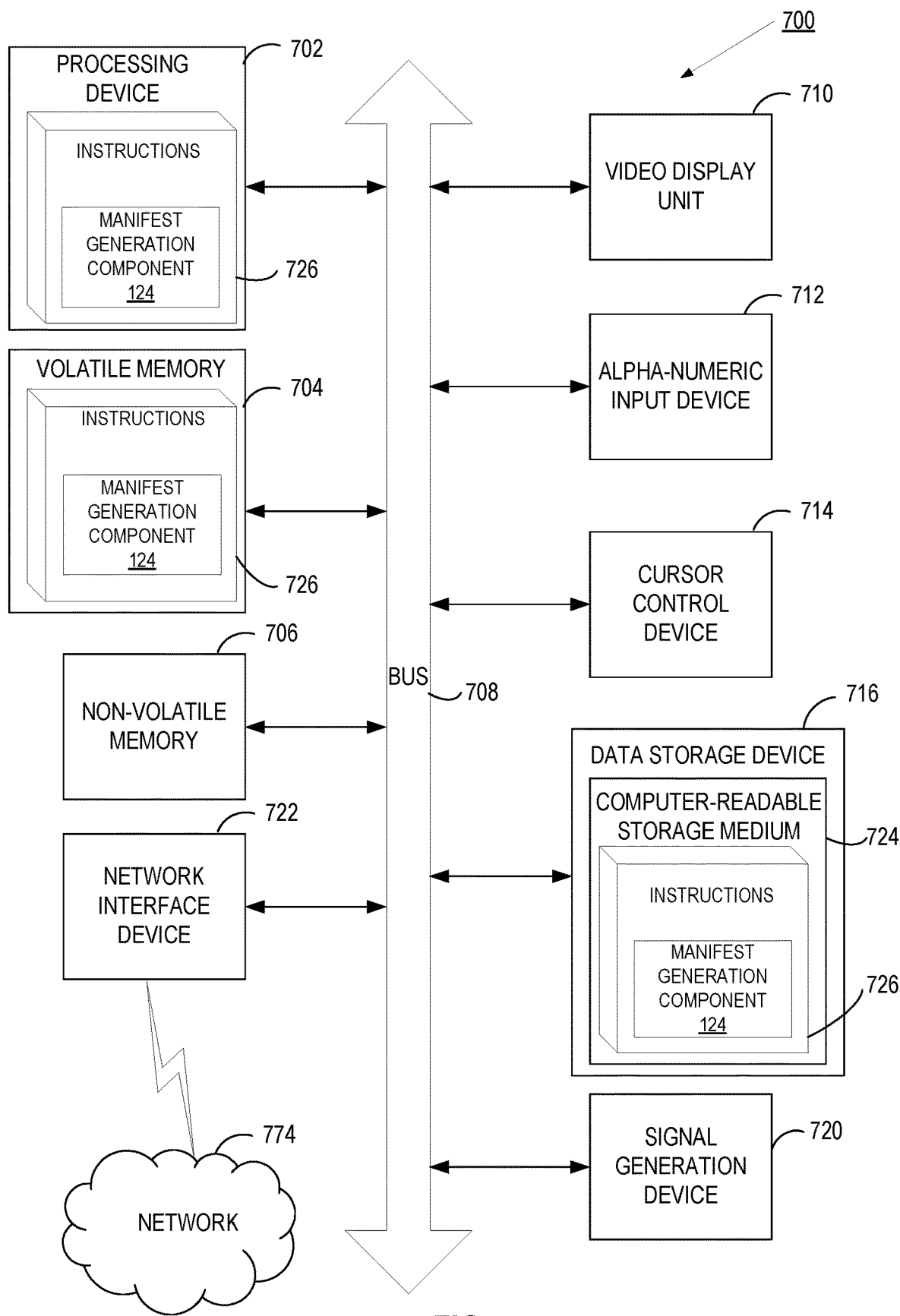
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing device 120 or one or more of the nodes 140A-Z of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding manifest generation component 124 of FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: analyzing a program package associated with a plurality of objects of a computer program; determining a state of a file system after an installation of the program package; generating a manifest that corresponds to the computer program and represents the state of the file system after the installation, the manifest comprising a hash tree that comprises object identification data of an object of the plurality of objects of the computer program; and providing the manifest to one or more computing devices.

Example 2 is a method of example 1, wherein determining the state of the file system comprises: simulating the installation of the program package; and identifying a file system location of one or more of the plurality of objects in view of the simulating the installation.

Example 3 is a method of example 1, wherein the manifest provides data for updating a file system of the one or more computing devices to enable execution of the computer program.

Example 4 is a method of example 1, wherein generating the manifest comprises: calculating a plurality of hashes for the plurality of objects of the computer program; and creating the hash tree in view of the plurality of hashes, wherein the hash tree comprises a hash of a data block of the object of the computer program.

Example 5 is a method of example 1, wherein the hash tree comprises a leaf node and a non-leaf node, wherein the leaf node comprises a hash value of the object of the computer program and the non-leaf node comprises a hash of the hash value.

Example 6 is a method of example 1, wherein the object identification data comprises an identifier for a content addressable store, wherein the identifier comprises a hash of the object stored in the content addressable store.

Example 7 is a method of example 1, wherein the manifest corresponds to a plurality of computer programs available for installation on the one or more computing devices, and wherein the manifest comprises a hash tree for each of the respective plurality of computer programs.

Example 8 is a system comprising: a memory; a processing device operatively coupled to the memory, the processing device to: determine a state of a file system after an installation of a computer program; generate a manifest that corresponds to the computer program and represents the state of the file system after the installation, the manifest comprising a hash tree that comprises object identification data of an object of the plurality of objects of the computer program; and transmit the manifest to a decentralized content store accessible by one or more computing devices, the decentralized content store comprising the plurality of objects to enable execution of the computer program.

Example 9 is a system of example 8, wherein the manifest provides data for updating a file system of the one or more computing devices to enable execution of the computer program.

Example 10 is a system of example 8, wherein to generate the manifest the processing device is to: calculate a plurality of hashes for the plurality of objects of the computer program; and create the hash tree in view of the plurality of hashes, wherein the hash tree comprises a hash of a data block of the object of the computer program.

Example 11 is a system of example 8, wherein the hash tree comprises a leaf node and a non-leaf node, wherein the leaf node comprises a hash value of the object of the computer program and the non-leaf node comprises a hash of the hash value.

Example 12 is a system of example 8, wherein the object identification data comprises an identifier for a content addressable store, wherein the identifier comprises a hash of the object stored in the content addressable store.

Example 13 is a system of example 8, wherein the manifest corresponds to a plurality of computer programs available for installation on the one or more computing devices, and wherein the manifest comprises a hash tree for each of the respective plurality of computer programs.

Example 14 is a non-transitory machine-readable storage medium storing instructions that cause a processing device to: analyze a program package associated with a plurality of objects of a computer program; determine a state of a file system after an installation of the program package; generate a manifest that corresponds to the computer program and represents the state of the file system after the installation, the manifest comprising a hash tree that comprises object identification data of an object of the plurality of objects of the computer program; and provide the manifest to one or more computing devices.

Example 15 is a non-transitory machine-readable storage medium of example 14, wherein to determine the state of the file system the processing devise is to: simulate the installation of the program package; and identify a file system location of one or more of the plurality of objects in view of the simulating the installation.

Example 16 is a non-transitory machine-readable storage medium of example 14, wherein the manifest provides data for updating a file system of the one or more computing devices to enable execution of the computer program.

Example 17 is a non-transitory machine-readable storage medium of example 14, wherein to generate the manifest the processing device is to: calculate a plurality of hashes for the plurality of objects of the computer program; and create the hash tree in view of the plurality of hashes, wherein the hash tree comprises a hash of a data block of the object of the computer program.

Example 18 is a The non-transitory machine-readable storage medium of example 14, wherein the hash tree comprises a leaf node and a non-leaf node, wherein the leaf node comprises a hash value of the object of the computer program and the non-leaf node comprises a hash of the hash value.

Example 19 is a non-transitory machine-readable storage medium of example 14, wherein the object identification data comprises an identifier for a content addressable store, wherein the identifier comprises a hash of the object stored in the content addressable store.

Example 20 is a The non-transitory machine-readable storage medium of example 14, wherein the manifest corresponds to a plurality of computer programs available for installation on the one or more computing devices, and wherein the manifest comprises a hash tree for each of the respective plurality of computer programs.

Example 21 is a method comprising: determining a state of a file system after an installation of a computer program; generating a manifest that corresponds to the computer program and represents the state of the file system after the installation, the manifest comprising a hash tree that comprises object identification data of an object of the plurality of objects of the computer program; and transmitting the manifest to a decentralized content store accessible by one or more computing devices, the decentralized content store comprising the plurality of objects to enable execution of the computer program.

Example 22 is a method of example 21, wherein the manifest provides data for updating a file system of the one or more computing devices to enable execution of the computer program.

Example 23 is a method of example 21, wherein generating the manifest comprises: calculating a plurality of hashes for the plurality of objects of the computer program; and creating the hash tree in view of the plurality of hashes, wherein the hash tree comprises a hash of a data block of the object of the computer program.

Example 24 is a method of example 21, wherein the hash tree comprises a leaf node and a non-leaf node, wherein the leaf node comprises a hash value of the object of the computer program and the non-leaf node comprises a hash of the hash value.

Example 25 is a method of example 21, wherein the object identification data comprises an identifier for a content addressable store, wherein the identifier comprises a hash of the object stored in the content addressable store.

Example 26 is a method of example 21, wherein the manifest corresponds to a plurality of computer programs available for installation on the one or more computing devices, and wherein the manifest comprises a hash tree for each of the respective plurality of computer programs.

Example 27 is an apparatus comprising a means for analyzing a program package associated with a plurality of objects of a computer program; a means for determining a state of a file system after an installation of the program package; a means for generating a manifest that corresponds to the computer program and represents the state of the file system after the installation, the manifest comprising a hash tree that comprises object identification data of an object of the plurality of objects of the computer program; and a means for providing the manifest to one or more computing devices.

Example 28 is an apparatus of example 27, wherein the means for determining the state of the file system comprises: a means for simulating the installation of the program package; and a means for identifying a file system location of one or more of the plurality of objects in view of the simulating the installation.

Example 29 is an apparatus of example 27, wherein the manifest provides data for updating a file system of the one or more computing devices to enable execution of the computer program.

Example 30 is an apparatus of example 27, wherein the means for generating the manifest comprises: a means for calculating a plurality of hashes for the plurality of objects of the computer program; and a means for creating the hash tree in view of the plurality of hashes, wherein the hash tree comprises a hash of a data block of the object of the computer program.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "analyzing," "determining," "detecting," "generating," "providing," "transmitting," "updating," "enhancing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
analyzing a program package associated with a plurality of files of a computer program, wherein the plurality of files comprise a first file and a second file;
determining a state of a file system after an installation of the program package;
calculating a first hash value in view of content of the first file, wherein the first hash value comprises identification data to retrieve the first file of the computer program from a data store;
creating a hash tree in view of the plurality of files of the computing program, wherein the hash tree comprises the first hash value of the first file, a second hash value of the second file, and a hash of at least one of the first hash value or the second hash value;
generating, by a processing device, a manifest that corresponds to the computer program and represents the state of the file system after the installation, wherein the manifest comprises the hash tree; and
providing the manifest to one or more computing devices.

2. The method of claim 1, wherein determining the state of the file system comprises:
simulating the installation of the program package; and
identifying a file system location of one or more of the plurality of files in view of the simulating the installation.

3. The method of claim 1, wherein the manifest provides data for updating a file system of the one or more computing devices to enable execution of the computer program.

4. The method of claim 1, wherein creating the hash tree comprises:
calculating a hash value for each of the plurality of files of the computer program; and
updating the hash tree to comprise the hash value for each of the plurality of files.

5. The method of claim 1, wherein the hash tree comprises a leaf node and a non-leaf node, wherein the leaf node comprises the first hash value and the non-leaf node comprises the hash of the first hash value.

6. The method of claim 1, wherein the data store is a content addressable store and wherein the first hash value comprises an identifier for retrieving the first file from the content addressable store.

7. The method of claim 1, wherein the manifest corresponds to a plurality of computer programs available for installation on the one or more computing devices, and wherein the manifest comprises a hash tree for each of the respective plurality of computer programs.

8. A system comprising:
a memory;
a processing device operatively coupled to the memory, the processing device to:
determine a state of a file system after an installation of a computer program that comprises a plurality of files;
calculate a first hash value in view of content of a first file of the plurality of files, wherein the first hash value comprises identification data to retrieve the first file from a data store;
create a hash tree in view of the plurality of files of the computing program, wherein the hash tree comprises the first hash value of the first file, a second hash value of a second file of the plurality of files, and a hash of at least one of the first hash value or the second hash value;
generate a manifest that corresponds to the computer program and represents the state of the file system after the installation, wherein the manifest comprises the hash tree; and
transmit the manifest to a decentralized content store accessible by one or more computing devices, the decentralized content store comprising the plurality of files to enable execution of the computer program.

9. The system of claim 8, wherein the manifest provides data for updating a file system of the one or more computing devices to enable execution of the computer program.

10. The system of claim 8, wherein to create the hash tree the processing device is to:
calculate a hash value for each of the plurality of files of the computer program; and
update the hash tree to comprise the hash value for each of the plurality of files.

11. The system of claim 8, wherein the hash tree comprises a leaf node and a non-leaf node, wherein the leaf node comprises the first hash value and the non-leaf node comprises the hash of the first hash value.

12. The system of claim 8, wherein the data store is a content addressable store and wherein the first hash value comprises an identifier for retrieving the first file from the content addressable store.

13. The system of claim 8, wherein the manifest corresponds to a plurality of computer programs available for installation on the one or more computing devices, and wherein the manifest comprises a hash tree for each of the respective plurality of computer programs.

14. A non-transitory machine-readable storage medium storing instructions that cause a processing device to:
analyze a program package associated with a plurality of files of a computer program, wherein the plurality of files comprise a first file and a second file;
determine a state of a file system after an installation of the program package;
calculate a first hash value in view of content of the first file, wherein the first hash value comprises identification data to retrieve the first file of the computer program from a data store;
create a hash tree in view of the plurality of files of the computing program, wherein the hash tree comprises the hash value of the first file, a hash value of the second file, and a hash of at least one of the first hash value or the second hash value;

generate a manifest that corresponds to the computer program and represents the state of the file system after the installation, wherein the manifest comprises the hash tree; and provide the manifest to one or more computing devices.

15. The non-transitory machine-readable storage medium of claim 14, wherein to determine the state of the file system the processing devise is to:

simulate the installation of the program package; and identify a file system location of one or more of the plurality of files in view of the simulated installation.

16. The non-transitory machine-readable storage medium of claim 14, wherein the manifest provides data for updating a file system of the one or more computing devices to enable execution of the computer program.

17. The non-transitory machine-readable storage medium of claim 14, wherein to create the hash tree the processing device is to:

calculate a hash value for each of the plurality of files of the computer program; and update the hash tree to comprise the hash value for each of the plurality of files.

18. The non-transitory machine-readable storage medium of claim 14, wherein the hash tree comprises a leaf node and a non-leaf node, wherein the leaf node comprises the first hash value and the non-leaf node comprises the hash of the first hash value.

19. The non-transitory machine-readable storage medium of claim 14, wherein the data store comprises a content addressable store and wherein the first hash value comprises an identifier to retrieve the first file from the content addressable store.

20. The non-transitory machine-readable storage medium of claim 14, wherein the manifest corresponds to a plurality of computer programs available for installation on the one or more computing devices, and wherein the manifest comprises a hash tree for each of the respective plurality of computer programs.

* * * * *